United States Patent [19]

Schuch

[11] Patent Number: 4,730,919
[45] Date of Patent: Mar. 15, 1988

[54] SLIDE VIEWER

[75] Inventor: Albert Schuch, Schwechat, Austria

[73] Assignee: Patent-Treuhand-Gesellschaft fur Elektrische Gluhlampen m.b.H, Munich, Fed. Rep. of Germany

[21] Appl. No.: 782,705

[22] Filed: Oct. 1, 1985

[30] Foreign Application Priority Data

Oct. 5, 1984 [AT] Austria ................ 3165/84

[51] Int. Cl.⁴ .................................. G03B 23/00
[52] U.S. Cl. ...................... 353/79; 353/95; 353/75; 353/76; 353/103
[58] Field of Search ............ 353/75, 77, 79, 80, 353/95, 103, 113, 114, 115, 116, 117, 22, 23, 78, 68, 122

[56] References Cited

U.S. PATENT DOCUMENTS

| | | | |
|---|---|---|---|
| 1,161,660 | 11/1915 | Guerzoni et al. | 353/103 |
| 2,489,835 | 11/1949 | Traub | 353/79 |
| 3,282,151 | 11/1966 | Bottani | 353/85 |
| 3,352,205 | 11/1967 | Brinkmann | 353/112 |
| 3,479,116 | 11/1969 | Anderson | 353/77 |
| 3,711,195 | 1/1973 | Gehlert et al. | 353/116 |
| 3,801,199 | 4/1974 | Kaye | 353/74 |
| 4,170,408 | 10/1979 | Behr | 353/79 |
| 4,213,679 | 7/1980 | Sakamoto et al. | 353/79 |
| 4,466,716 | 8/1984 | Kramer et al. | 353/117 |

FOREIGN PATENT DOCUMENTS

| | | | |
|---|---|---|---|
| 536005 | 10/1955 | Belgium. | |
| 1120746 | 12/1961 | Fed. Rep. of Germany | 353/116 |
| 2629185 | 1/1980 | Fed. Rep. of Germany. | |
| 609065 | 9/1948 | United Kingdom | 353/79 |
| 612376 | 11/1948 | United Kingdom | 353/79 |

Primary Examiner—Charles Frankfort
Assistant Examiner—Patrick R. Scanlon
Attorney, Agent, or Firm—Ladas & Parry

[57] ABSTRACT

A folding slide viewer has a rear projection screen which swings into a first position for storage. In a second, operating position, the projection screen it is provided with a lightproof bellows. The optical axis of the lens system is inclined at an angle with respect to the horizontal base of the housing. A reflector is along the optical axis of the lens system, when the screen is in its operating position, to reflect an image onto the screen. An image trap is swingable between a first position perpendicular to a longitudinal axis of the slide magazine and a second position perpendicular to the optical axis of the lens system.

11 Claims, 4 Drawing Figures

SLIDE VIEWER

The invention relates to slide viewer comprising a housing in which there is disposed a light source, a system of lenses, an image trap (aperture), an image changer and a reflector, and which is provided with a back projection screen and a magazine guide.

To have a possibility of easy viewing, slide viewers of this kind must have a projection screen which is positioned as vertial as possible. In the case of slide viewers comprising a reflector, this is practically not feasible because the projected image gets distorted off a certain angle of the projection screen and/or the corners of the image get insufficiently illuminated. For that reason there have already been proposed slide viewers comprising two reflectors which, however, on the one hand require greater expenditures on materials and higher manufacturing costs and, on the other hand, provide a worse illumination because of unavoidable losses of light. In any case, such slide viewers are disadvantageous because of a relatively great overall height, taking up too much space when being stored, warehoused, transported, or the like.

Known in the art is a moving picture viewer comprising a projector, which is inclined toward the rising surface, a reversible reflector and a hinged (foldable) projection screen, and which is provided with an especially formed cassette for viewing films (U.S. Pat. No. 3,801,199). These measures, however, may not be transferred to a slide viewer because in it the magazine for slides must be guided substantially horizontally; this is based on the fact that, on the one hand, when viewing the first and last slides, the magazine protrudes from the housing and, on the other hand, together with the slides has a considerable weight which must be transported. Therefore, the magazine guide would have to be arranged relatively high in the housing, and the transporting means would have to be over-dimensioned mechanically and powerwise. Furthermore, the slides would have to be moved through an image change in an inclined position which would lead to frictional losses and would require a strong image changer. Moreover, it would be necessary to provide auxiliary means which would prevent the magazine from slipping out by itself from the inclined magazine guide.

It is the object of the invention to remove these deficiencies and create a slide viewer which is compact and has small external dimensions, offers to view slides on an as much as possible vertical projection screen, and requires relatively small expenditures on materials and its production.

This object is achieved with a slide viewer of the above indicated kind, in that according to the invention the optical axis of the system of lenses is inclined at an angle to the rising surface of the housing, the projection screen is flexibly connected with the housing, is swingable from a position lying at the upper side of the housing to a working position and provided with a lightproof screen, and the image trap is at least temporarily mounted on a plane which is perpendicular to the optical axis of the system of lenses, the reflector being arranged on the optial axis of the system of lenses when the projection screen is in a working position.

In this way there is created a slide viewer having a projection screen which practically may be as vertical as desired during the viewing, and which for purposes of storage or transportation can be turned down onto the upper side of the housing, due to which the external dimensions of the housing can be kept extremely small.

Although the lightproof screen may be made of a rigid structural member, the screen according to a preferred development of the invention is made of a bellows which is mounted on the upper side of the housing.

Furthermore, in the case of a substantially parallel guidance of the magazine to the rising surface of the housing, the image trap may be hinged and swingable from a plane which is vertical to the plane of the magazine guide to a plane which is vertical to the optical axis of the system of lenses. In this way there are no limits set for the angle of inclination of the optical axis with respect to the magazine guide or with respect to magazines used conventionally, which because of their weight in a loaded state must be guided as horizontally as possible.

Conventional slide viewers include semiautomatic or fully automatic image changers (frame changers), it also being possible to actuate the latter manually. It is desirable that the image changer mentioned last also be provided in the invention. Although an avertence of the image trap could be carried out by a self-contained drive, it is preferable that the image trap be mechanically coupled with the image changer, owing to which only one urge (impulse) effects a shift and the manual operation is simplified.

At the same time the image changer may have, as is known, a sliding gate at which there is formed a cam acting upon the image trap, while the image trap in this position rests against a stop. This brings about an especially simple mechanical coupling.

It is a further advantage that the image trap, when being in a position vertical to the plane of the magazine guide, is stopped by means of a releasable stopping device actuable by a sliding gate. This ensures that the insertion of slides into the image trap cannot go wrong.

Further the image trap may be prestressed by a spring in a position which is vertical to the optical axis of the system of lenses. This prevents the image trap from stopping in another position and brings about a precise alignment of the image trap, although an avertence could also occur under the influence of gravity.

Furthermore, the image trap can cooperate with a damping device in order to stop noises and damages.

It is possible to achieve a further decrease of the structural height of the housing by positioning the reflector in the housing so as to be vertically adjustable, especially slidable.

At the same time, it is advantageous that the reflector is prestressed with a spring into its upper position limited by stops since due to that it is easier to unfold the slide viewer.

To further ease the folding of the slide viewer, it is favorable to fasten the bellows at the upper side and approximately in the middle of the reflector.

Moreover, in its lower position the reflector can cooperate with an electric switch to which at least a light source is connected. This brings about the advantage that when the slide viewer is folded, the light source is always switched off and no overheating can occur. Furthermore, the handling of the slide viewer is simplified.

In order to improve the illumination of the corners of the image of a projected slide, the system of lenses exhibits advantageously an aspherical condenser lens.

The invention will hereinafter be illustrated in greater detail by means of a preferred embodiment which is schematically represented in the drawings.

Figure 1:
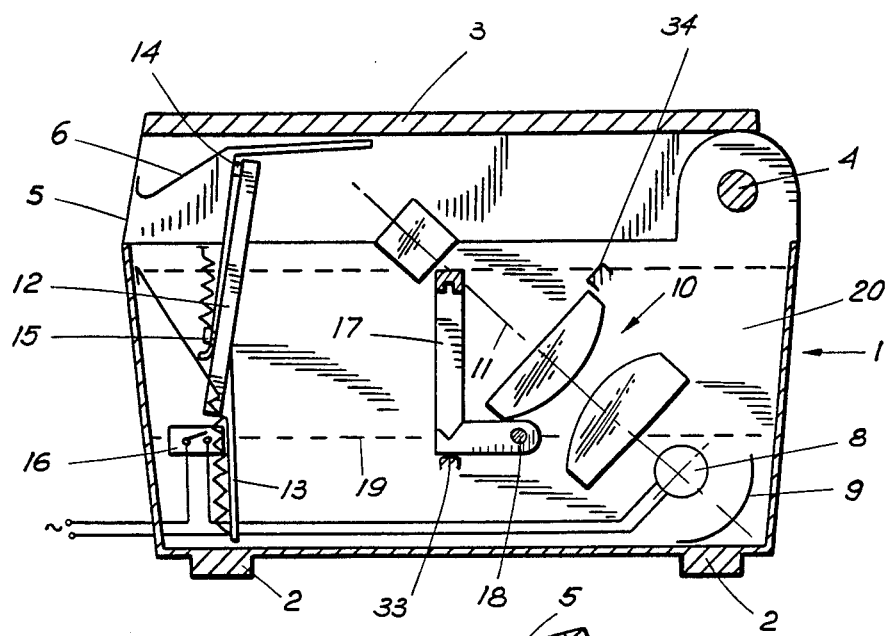
FIG. 1 shows a section through a slide viewer being in folded state.
Figure 2:
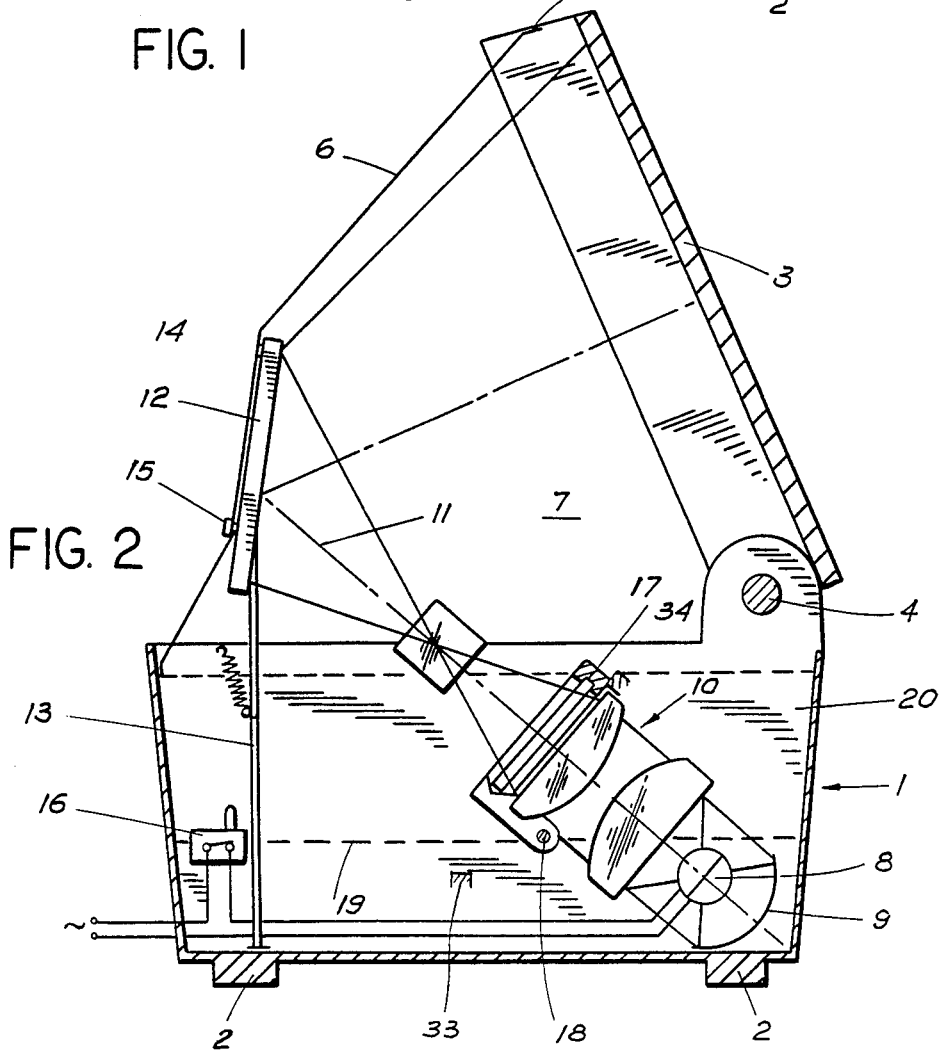
FIG. 2 shows a corresponding section when the slide viewer is in operation.

According to FIGS. 1 and 2, the slide viewer has a housing 1 with legs 2; a back projection screen 3 is hinged to the housing, the axis of rotation 4 passing at the front of the housing 1. Projection screen 3, which is surrounded by a frame 5, has essentially the dimensions of the top side of the housing; when turned down (FIG. 1), it is arranged on the housing 1 as a cover and held in this position by a (not shown) closure. Upon releasing the closure, projection screen 3 is raised into its operating position shown in FIG. 2, preferably by a spring (not shown), and is kept in this position by (not shown) stops.

A lightproof screen in the form of a bellows 6 made of cloth or the like is, on the one hand, attached at the upper side of the housing and, on the other hand, at frame 5 of projection screen 3, due to which there is provided a screened interior space 7, which is impermeable to light, when projection screen 3 is in a raised position (FIG. 2).

A light source 8 along with an auxiliary mirror 9 is disposed in the housing 1 at the front thereof. Further a light gathering system of lenses 10 is accomodated in the housing 1, the optical axis 11 of which is inclined at an angle to the rising surface of the housing 1, defined from the legs 2 of the housing 1. To provide a better illumination of the corners of an image, a condenser lens of the system of lenses 10 is formed aspherically.

A height-adjustable reflector 12 is provided at the back of the housing 1 which, when raising the projection screen 3 is pushed upwards by spring 36 from a lowered position of rest (FIG. 1) to a working position (FIG. 2). For this purpose reflector 12 is slidable in guides 13, which are substantially vertical.

The ends of guides 13 serve as stops 37 for limiting movement of the reflector 12. In its working position reflector 12 is arranged on the optical axis 11 of the system of lenses 10 so that it reroutes the light emanating from the system of lenses to projection 3.

Furthermore, the lightproof bellows 6 is fastened at the upper side of reflector 12, for example, by means of an adhesive tape 14, and approximately in the middle, for example, by means of a guide pin 15. The purpose of these measures will be explained hereinafter.

When lowered, reflector 12 actuates an electric switch 16, for example, a microswitch, to which at least a light source 8 is connected, and which is switched off when reflector 12 is lowered. Preferably all electric circuits, such as those of a ventilated motor for the light source 8, an electric drive of the image changer, etc., should be connected to switch 16.

In housing 1 an image trap 17* is pivotable about an axis 18; by means of a mechanism still to be described the image trap is swingable from a projecting position (FIG. 2), in which it is perpendicular to the optical axis 11 of the system of lenses 10, to an image change position (FIG. 1), in which it lies in a plane vertical to the longitudinal axis of a magazine guide 19. Magazine guide 19 proceeds as usual parallel to the rising surface of housing 1 and is arranged at the bottom side of a magazine shaft 20 which passes through the housing 1.

* Should image trap not be designated by "17"0 and the axis by "18"— Translator's remark.

Figure 3:
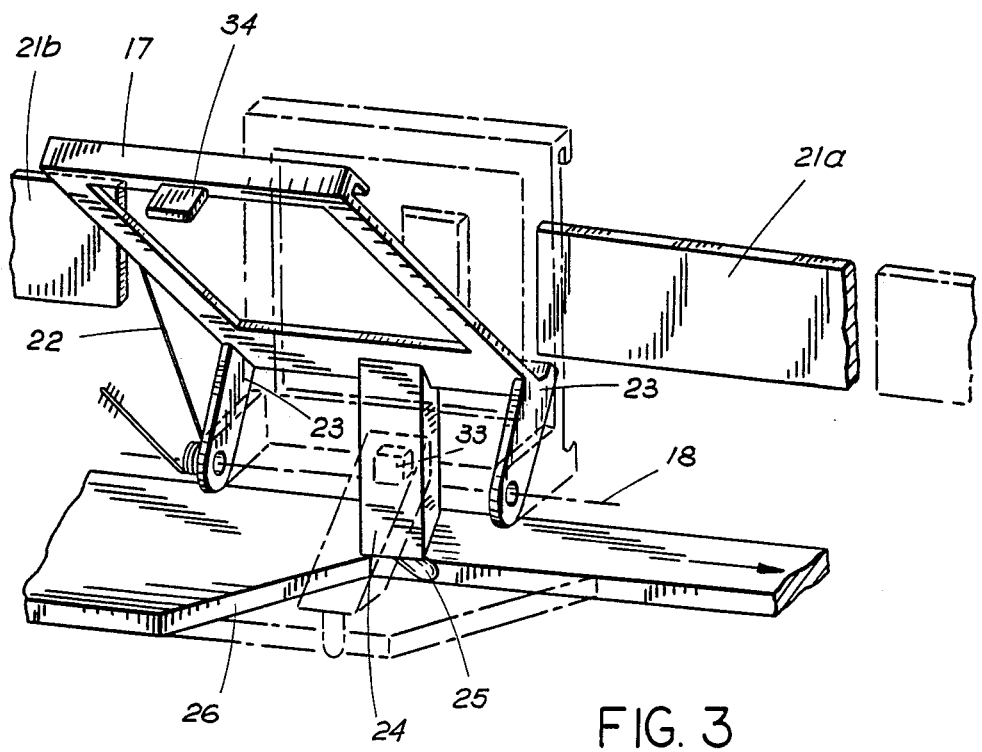
FIG. 3 shows a diagrammatic view of an image trap and a portion of a sliding gate of an image changer.

FIG. 3 gives a perspective view of image trap 17 in its projecting position, its image change position being shown by dotted lines. In order to direct image trap 17 between these two positions, the image changer is provided with a sliding gate 21 which is formed in a manner known and, preferably, is actuable manually and/or by a motor. In the projecting position, in which the image trap 17 is perpendicular to the optical axis 11 of the system of lenses 10, the image trap 17 rests against stops 33,34 and is put under tension against the stops by a spring 22.

The bottom side of image trap 17 is provided with projecting arms 23 with which it sits on pivots (not shown) forming axis 18, which are rigidly attached in housing 1. Image trap 17 is further provided with an elongation 24 at the bottom side thereof, which is directed toward the same side as arms 23, and which at its free end carries a pivot 25 which has a semispherical head. Pivot 25 cooperates with a cam 26 formed at the sliding gate 21, as will be illustrated hereinafter.

Figure 4:
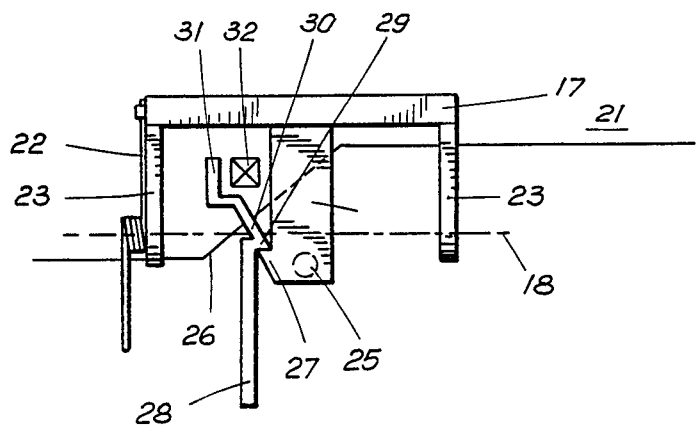
FIG. 4 shows a top view of an image trap and a stopping device.

FIG. 4 is a top plan view of image trap 17 when being in an image change position. To transiently arrest the image trap 17 in that position for the purpose of an unhampered image change, elongation 24 is provided with a detent 27 onto which spring 28 acts, the spring being especially made of a synthetic material. Spring 28 has a catch 29 cooperating with detent 27, an inclined plane 30 adjoining the catch, and an elongation 31 following the plane. A stop 32 is foreseen on the sliding gate 21, in a predetermined place thereof. This stop cooperates with elongation 31 in order to release spring 28 from detent 27.

The mode of operation of the slide viewer according to the invention is described below.

After the closure of frame 5 has been released, the projection screen 3 is deviated due to spring tension (or merely manually) from the position at the upper side of the housing shown in FIG. 1 to an operating position limited by stops, shown in FIG. 2. Therewith reflector 12 is released and because of spring tension raised into its upper position which is limited by stops; at the same time bellows 6 unfolds and electric switch 16 gets switched on.

The sliding gate 21 of the image changer is inserted in housing 1 so that image trap 17 is in a position as shown in FIGS. 2 or 3 (solid lines). After a magazine for slides has been arranged in magazine shaft 20, sliding gate 21 is pushed out of the housing 1, either manually or by means of a motor, while cam 26 acts upon pivot 25 due to which image trap 17 is pivoted about its axis 18 and kept in its upright position because spring 28 together with its inclined plane 30 slides over detent 27 of image trap 17 and snaps in with its catch 29 behind detent 27 (FIG. 3—dotted lines, FIG. 4).

When the following sliding gate 21 is inserted into the housing 1, finger 21a of sliding gate 21 gets hold of a slide in the magazine for slides and pushes it into the upright image trap 17. At the end of the sliding motion stop 32 strikes against elongation 31 of spring 28 and deflects it so far that detent 27 of image trap 17 is released. As soon as image trap 17 is free, it deviates under the action of the spring 22 into a projecting position (FIG. 3—solid lines); preferably, there is provided a damping in order to subdue the stroke of the image trap 17 against the stops defining the projecting position. This position is schematically represented in FIG. 2, a slide being indicated in the image trap 17.

The slide which is in image trap 17 is projected onto projection screen 3, where it can be viewed.

After the viewing the sliding gate 21 is pushed out, while image trap 17 is raised by means of cam 26 acting on pivot 25 and secured with the help of spring 28; at the same time spring 22 is under tension. After image trap 17 has been arrested in this position, a flag 21b, which is foreseen at sliding gate 21, acts upon the slide and forwards it from image trap 17 to the magazine for slides. The distance between the finger 21a and the flag 21b of the sliding gate 21 must be larger than in the case of conventional sliding gates because of cam 26.

When the viewing of slides is completed, projection screen 3 is lowered against the force of the spring weight, while bellows 6 is folded between frame 5 and reflector 12. When projection screen 3 is further lowered, it abuts the upper edge of reflector 12 and pushes it downwards in its guides 13 against the force of the spring 36. At the same time bellows 6 is automatically drawn into the housing 1 along with guide pin 15. At the end of the downward motion reflector 12 switches off the electric switch 16 to separate the slide viewer from the supply current. After locking up frame 5, the slide viewer again occupies its non-working position shown in FIG. 1.

Thus, the invention creates a slide viewer whose external dimensions in an out of operation state are extremely small; this is advantageous for warehousing, shipping and storing it. When being in a state of operation, projection screen 3 is extremely steep, bringing about a convenient viewing of slides.

Within the scope of the invention, there is a possibility of numerous modifications of the practical example shown and described. So, bellows 6 may be replaced by a rigid screen which, if need be, is telescopically extensible. Reflector 12 could be mounted on swivel arms, or could be pivotable about an axis passing at the bottom side of the reflector.

Furthermore, there could be provided a rigid image trap to which a slide channel arranged in its plane adjoins. An inclined, if need be, turnable magazine guide is also imaginable.

On the other hand, it would also be possible to control the turning of the image trap by an electromotor or a solenoid.

In view of an aspherical condenser lens, the corners of the image of a projected slide are well illuminated. A further advantage of an aspherical condenser lens over those known is its lesser thickness.

What is claimed is:

1. A slide viewer comprising a housing having a horizontal base surface, said housing comprising a light source, a lens system having an optical axis, an image trap, an image changer and a reflector, said housing provided with a back projection screen and a magazine guide having a longitudinal and substantially horizontal axis, wherein the optical axis of the lens system is inclined at an angle to the horizontal base surface of the housing, said projection screen pivotally connected within the housing and swingable between a first position in which said projection screen is lying at the upper side of the housing, and a second, operating position and is provided with a lightproof screen, the image trap is hinged and is swingable between a first position in which it is arranged in a plane perpendicular to said longitudinal axis of the magazine guide, and a second position in which it is arranged in a plane perpendicular to said optical axis of the lens system, and the reflector arranged in the optical axis of the lens system when the projection screen is in its second position, whereby a film slide may be transported by means of said image changer from a magazine positioned in said magazine guide into said image trap being in its first position, and further transported to a projecting position by means of the image trap by swinging the latter to its second position.

2. A slide viewer according to claim 1, wherein said lightproof screen is formed of a foldable bellows which is secured to the upper side of the housing.

3. A slide viewer according to claim 1, wherein the image trap is mechanically coupled with the image changer.

4. A slide viewer according to claim 3, wherein the image changer has a sliding gate adapted to be moved in a plane perpendicular to said longitudinal axis of the magazine guide and is provided with a cam acting on the image trap to move the image trap between its first and second positions, the image trap resting against a stop in either of said positions.

5. A slide viewer according to claim 1, wherein the image trap, when being in its first position, is arrested by means of a releasable latch device actuated by said image changer.

6. A slide viewer according to claim 1, wherein the image trap is biased by a spring into its second position.

7. A slide viewer according to claim 1 wherein the reflector is arranged in the housing so as to be slidable in substantially vertical guides between a first, upper position in which it is arranged in said optical axis of the lens system, and a second, lower position.

8. A slide viewer according to claim 7, wherein the reflector is biased by a spring into its first, upper position and is resting against stop when in said first, upper position.

9. A slide viewer according to claim 7, wherein the reflector, when in its second, lower position, cooperates with an electric switch to which at least said light source is connected.

10. A slide viewer according to claim 7, wherein said foldable bellows is fastened at the upper side and substantially in the middle of the rear side of the reflector.

11. A slide viewer according to claim 1, wherein the lens system comprises two aspherical condensor lenses.

* * * * *